May 28, 1935. J. BIJUR Re. 19,589

LUBRICATING INSTALLATION

Original Filed Jan. 31, 1923 2 Sheets-Sheet 1

INVENTOR
Joseph Bijur, Deceased,
by Auto Research Corporation, Assignee
BY
Dean Fairbank Nickel & Foster
ATTORNEYS May 28, 1935. J. BIJUR Re. 19,589

LUBRICATING INSTALLATION

Original Filed Jan. 31, 1923 2 Sheets-Sheet 2

INVENTOR
Joseph Bijur, Deceased,
by Auto Research Corporation, Assignee.
BY
Dean Fairbank Hirsch & Foster
ATTORNEYS Reissued May 28, 1935 Re. 19,589

UNITED STATES PATENT OFFICE 19,589

LUBRICATING INSTALLATION

Joseph Bijur, deceased, late of New York, N. Y., by Auto Research Corporation, Dover, Del., assignee Original No. 1,797,203, dated March 17, 1931, Serial No. 616,016, January 31, 1923. Application for reissue September 14, 1932, Serial No. 633,114

21 Claims. (Cl. 184—7)

Figure 1:
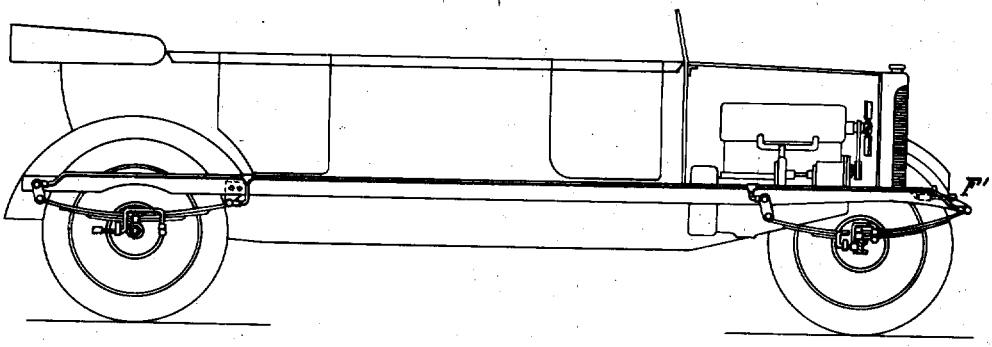

The present invention relates to the lubrication of mechanical apparatus, by the use of a separate implement such as a lubricant gun, and the invention has its preferred application to motor vehicle lubrication.

It is an object of the invention to provide an installation for rendering convenient and expeditious the lubrication of many or all of the bearings on the chassis by the use of a lubricant gun, and more specifically, to eliminate the need for separate and distinct application and operation of the gun for each bearing.

It is another object to lubricate the bearings reliably from an oil gun without soiling the hands, without likelihood of inadvertently omitting the lubrication of some of the multiplicity of bearings, and without substantial physical discomfort in lubricating the more inaccessible bearings.

Another object is to provide a lubricating installation, the use of which shall not require the exercise of selective discretion, but in which, as the result of a simple manipulation, lubrication is effected at each of a group of bearings, and which is dependable regardless of the tightness or looseness of any of the bearings.

Another object is to provide an installation of the above type which will not be deranged by the entry of dust or dirt and the operation of which will not require much manual effort.

Another object is to provide a system of the type mentioned, the elements of which are of simple and inexpensive construction, the assembly or installation of which shall be particularly easy and shall not require substantial modification in the structure of the vehicle, and which avoids the use of parts protruding substantially from the vehicle:

Another object is to provide a chassis lubricating system affording convenience in lubrication while dispensing with the need for flexible conduits to bridge between the relatively moving parts of the vehicle.

Another object is to provide an installation which, if injured as in an accident, will not be disabled beyond the vicinity of the damage, and in which repair or replacement may be readily effected.

According to one preferred feature of the invention, the apparatus, the bearings of which are to be lubricated, is provided with an appropriate inlet fitting for application thereto of a lubricant gun, preferably an oil gun, said fitting communicating with a plurality of the bearings, through corresponding outlets in suitable piping installed upon the apparatus. To avoid relief of the pressure from the gun and discharge of excess lubricant at the nearest or loosest of the bearings with consequent deficiency at the remaining bearings, the line is provided with special control means which will respond automatically to the pressure applied at the gun to assure delivery of lubricant in desired predetermined proportions to the various bearings. The control means in one preferred embodiment, comprises highly restricted ducts in the various branches of the piping to the various bearings, said ducts offering a resistance to flow which is high relative to the resistance of the conduit or line or of the bearings, so that the rate of delivery at each of the bearings, while pressure is applied, will be substantially controlled by the resistance in the ducts and not by the length of the line or the tightness or looseness of the bearings. In another embodiment, the delivery to substantially each of the bearings is controlled by a distinct measuring valve in the line, which opens under pressure transmitted from the lubricant gun, to pass oil and is automatically reclosed when a predetermined or measured quantity of oil has passed therebeyond.

The outlet restriction ducts or the valve control means are preferably in the form of pipe fittings connected directly to bearings in lieu of oil cups. Means is provided in the line, preferably valves, embodied in the outlet fittings to prevent leakage or escape of lubricant from the pipe line except when pressure is applied thereto from the exterior.

In the preferred application to motor vehicles, independent pipe lines are provided for each set of related bearings, each provided with an appropriate inlet fitting for application of the lubricant gun. Preferably one pipe line is provided on the chassis frame to supply the spring shackles and bolts, a second pipe line is on the front axle to lubricate the various bearings thereat, such as the king pins, tie rod bearings, the steering gear and front brakes, and a third line is on the rear axle, from which are lubricated the rear brake mechanism, the rear wheel bearings and the like.

To prevent the possibility of interference with the operation of the restriction ducts or the measuring valves of the outlet fittings by interception thereat of any particles of dirt introduced at the inlet fitting and carried with the oil, appropriate filter means is provided near each inlet fitting. To intercept any chips or other solids picked up in the length of the line beyond the filter, appropriate strainers are preferably provided at the outlet fittings.

Another feature of the invention is the interposition of an air chamber in the line between the inlet fitting and the filter, which permits quick discharge of the lubricant gun, notwithstanding the high resistance in the filter and in the line, the air chamber acting as a secondary source of pressure to slowly force the charge through the filter and the line toward the bearings, after the lubricant gun has been removed.

The above and other features of the invention may be more fully understood from the accompanying drawings in which are shown some of various possible embodiments of the several features of the invention.

Figure 2:
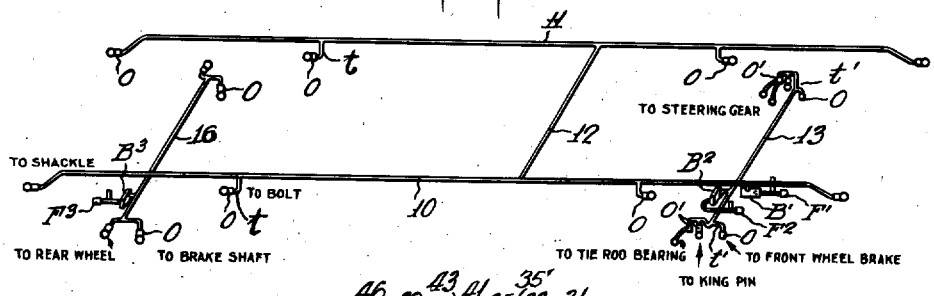
Figure 4:
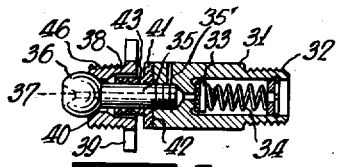
Figure 5:
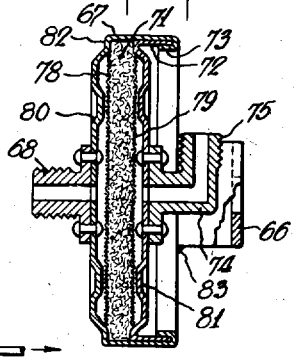
Figure 3:
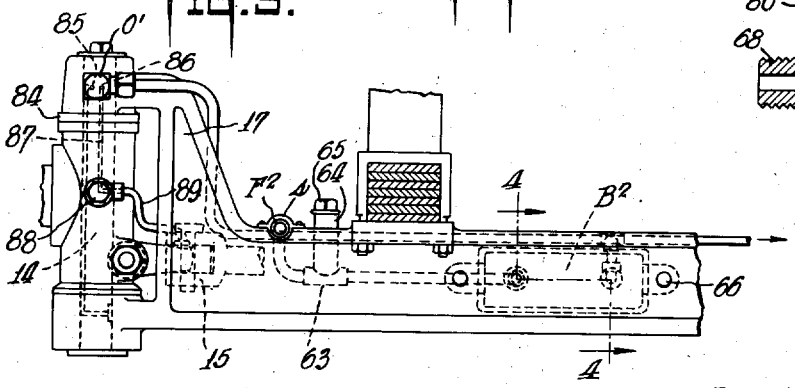
Figure 6:
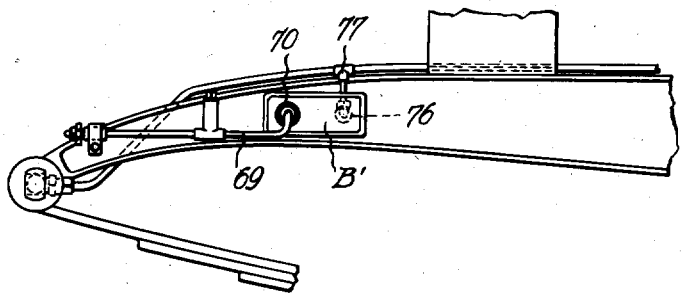
Figure 7:
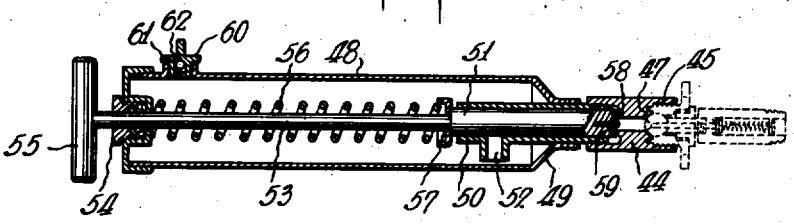
Figure 8:
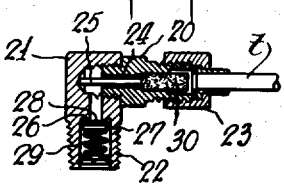
Figure 9:
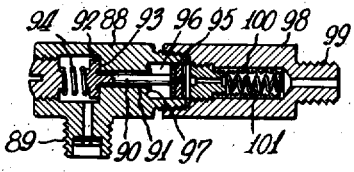

In the drawings,

Fig. 1 is a side elevation of a motor vehicle chassis, indicating the application of the piping, Fig. 2 is a piping diagram, Fig. 3 is a fragmentary detail on a larger scale illustrating the front axle installation, Fig. 4 is a sectional view taken along the line 4—4 of Fig. 3, Fig. 5 is a view in longitudinal cross-section of an inlet fitting, Fig. 6 is a view similar to Fig. 3 illustrating the chassis frame installation, Fig. 7 is a view in longitudinal cross-section of a preferred form of oil gun, Fig. 8 is a view in longitudinal cross-section of one form of control fitting, and;

Fig. 9 is a similar view of another type of control fitting.

Similar reference characters refer to similar parts throughout the several views of the drawings.

In Figs. 1 and 2, there is shown a motor vehicle chassis lubricating installation, including pipes 10 and 11 extending the length of the channel frame as shown, connected by a cross pipe 12. Each pipe is provided with a plurality of short taps *t* communicating with the contiguous spring bolts and shackles, each through an appropriate outlet fitting O.

A seamless metal pipe line 13 extends along the length of the front axle and is bent upward adjacent its right end for connection near the top of the right king pin 14, from which the tie rod bearing 15 is lubricated through a fitting O'. The left end of the pipe 13 supplies the left king pin and its associated tie rod bearing and preferably also the steering gear (not shown) through a similar fitting O'. Taps *t'* may be provided in line 13 through which the front brake linkage may be lubricated through similar outlet fittings O. The bearings at the rear axle, such as those of the brake linkage and the rear wheel bearings are supplied through a third independent solid metal pipe line 16 extending along the rear axle and connected to said bearings by appropriate fittings O. An inlet fitting for the chassis frame line at which the lubricant gun is to be applied for transmission of oil pressure to the outlet fittings thereof, is shown at F' upon one of the channel frames and near the front end of the vehicle, where it is readily accessible. A similar inlet fitting for the front axle line is indicated at $F^2$ adjacent the axle clevis 17 for ready access to the lubricant gun and the inlet fitting for the third or rear axle line is similarly disposed at $F^3$ near one end of said axle. Preferably the inlet fittings are securely anchored in place as by straps *s*, to prevent strain on the length of piping should the parts be roughly handled in applying or removing the gun.

In order to assure accurate distribution in accordance with the requirements of the various bearings on any of the three lines by the simple application of lubricant pressure applied at the corresponding inlet fitting, and more particularly to prevent the relief of pressure and the discharge of much of the oil charge through a bearing nearest the inlet fitting, particularly if such bearing be a relatively loose one, there is provided special control means at each of the tap outlets to the bearings, said control means being indicated diagrammatically at O in Fig. 2 by symbol □.

These control means may be the seepage or drip plugs fully described and shown in a number of alternative embodiments in copending application, Serial No. 580,668, filed August 9, 1922, now Patent 1,975,920 of October 9, 1934. One form of such fitting structure is shown in Fig. 8. Since this fitting taken by itself is no part of the present invention, it is noted only briefly here that it may comprise a pipe fitting stem 20 threaded into a second or support fitting 21, the latter having threads 22 for application in lieu of an oil cup, preferably directly at the bearing. The fitting has a cap 23 to which the end of the pipe tap *t* is secured by appropriate means. Within the bore 24 of element 20 is a pin 25 of practically the diameter of said bore affording a clearance in the order of about .001 or .002 inch, to provide a highly restricted, high resistance passage therethrough. The fitting element 21 is provided with a burnished valve seat 26 against which is normally pressed a relief valve 27 in the form of a disk having a flexible seating element 28 with a facing of oil paper or similar non-sticking material, said valve being normally held against its seat by a coil spring 29. A strainer plug 30 of felt fits into a corresponding socket in fitting element 20 in advance of the restriction stem 25, the exposed surface of said plug intercepting any chips or scale picked up in the line by the oil forced therethrough thereby preventing the eventual clogging of the restricted outlet and also preventing interference with the seating of the valve by the lodging of a particle of dirt at the valve seat.

Each inlet fitting comprises (see Fig. 5) a pipe element 31 secured as at 32 to the corresponding line and normally held closed against the entry of dust or dirt by a disk valve 33 therein, similar to valve 26 in the fitting of Fig. 8 heretofore described, and similarly pressed against its seat by a coil spring 34. The fitting has a coaxial shank 35 preferably threaded and pinned thereto as at 35', which includes an integral spherical head 36 through the length of which extends an axial passage 37 normally closed at its inner end by the valve 33. A loose fastening collar 38, provided with a knurled flange 39, encircles the shank 35 and has a spherical seat 40 for snug engagement with the ball 36. The ball is of larger diameter than the bore of the collar to prevent detachment of the latter, assembly of the inlet fitting parts being effected by securing the shank to the fitting, after the collar has been telescoped thereover. A compressible washer 41 interposed between the end 42 of the fitting piece 31 and the fastening collar 38 and a compressible sleeve 43 surrounding shank 35 serve to maintain the collar against rattling when the vehicle is in motion. The oil gun is provided with a nozzle 44 interiorly threaded as at 45 for coaction with external thread 46 on collar 38, and said nozzle has a spherical seating portion 47 to engage the spherical head 36 on the inlet fitting. To apply the gun, it is brought, as best indicated in Fig. 7 into correct juxtaposition with respect to the inlet fitting and the knurled flange 39 is turned to thread the nozzle 44 inward, so as to press the ball 36 firmly between the spherical seat 40 on the collar 38 and the spherical seat 47 on the gun nozzle 44. By the construction set forth, a tight leak-proof ball and socket connection is effected between the gun and the inlet fitting, which permits limited angular displacement of the gun, should the operating force upon the gun not be applied strictly along the axial line thereof.

A preferred embodiment of lubricating gun is shown in Fig. 7 and includes a cylinder 48 having an integral conical end 49 within which is secured a measuring or discharge tube 50, to the end of which the nozzle 44 heretofore described is affixed. The gun includes a plunger 51 snugly fitting within the tube 50 and normally closing the lateral oil inlet 52 thereof. The plunger has an integral reduced stem 53 extending axially through the cylinder 48 and projecting therefrom through a stuffing box 54 and having an integral operating handle 55. A coil spring 56 encircles stem 53 and presses against the collar 57 at the end of the plunger 51, to urge the latter against the annular seat 58 provided in the nozzle 44. The end of the piston is provided with a yielding seating portion 59 having an oil-proof facing to assure liquid-tight seating, in order to prevent escape of oil left in the gun after or preparatory to use. The gun plunger seat may be similar in construction to the relief valve in the fitting of Fig. 8 heretofore described. The oil gun casing has a removable plug 60 through which it is charged, said plug being provided with a valve 61 therein spring-pressed against its seat to close a venting duct 62 through which air enters as oil is ejected from the gun in operation. The plug 60 is preferably diametrically opposite the lateral oil inlet 52 of the charging cylinder and said inlet extends close to the wall of the gun, as shown, for a purpose appearing in the description of operation below.

It will be understood that the specific inlet fitting and the specific oil gun described, are largely illustrative, and that many of the beneficial results of the invention may be achieved by the use of other types of lubricant gun and with different connecting means therefor.

To intercept any solid particles of dirt which may be admitted to the line from the oil gun, and which, if allowed to be carried with the oil, might rapidly clog the small strainers 30 in the outlet fittings, there is provided special filter boxes B suitably mounted near the inlet fittings of the lines. As shown in Fig. 3, the filter box $B^2$ for the front axle is riveted or bolted as at 66 within the channel at the rear side of said axle; the filter box $B^3$ for the rear axle is similarly attached at the rear top or bottom of the latter, and filter box B′ for the chassis frame line is secured as shown in Fig. 6 to the inside of the channel frame of the vehicle.

A preferred form of filter element is best shown in the sectional view of Fig. 4. This device comprises a stamped metal rectangular casing 67 having a threaded inlet nipple 68 to which the length of pipe 69 from the corresponding inlet fitting is secured as by a suitable union 70. Within the casing 67 is an appropriate felt or other absorbent filter pad 71 held in position by a rectangular cover 72 telescoped into the casing base, the rim of the latter being crimped as at 73 over the rim of the cover. The cover element has an outlet bushing 74 also threaded as at 75 for connection by means of a union 76 to a T fitting 77 which connects to the length of the line as illustratively shown in Figs. 3 and 6. To prevent contact by bowing of any substantial portion of the filter element under oil pressure against the enclosing casing wall, which might interfere with the effectiveness of the filter, there is superposed over the faces of the filter element, sheets of metal gauze 78 and 79 contacted by ribs 80 and 81 pressed inward respectively from the casing and cover, the filter being clamped in position merely around its rim as at 82. Lugs 66 by which the filter casing is secured to the apparatus are preferably brazed or riveted as at 83 to the edge of the filter box.

In operation, after the gun is charged with oil and the filling plug 60 is secured, the operator applies the gun say to the inlet fitting $F^2$ on the front axle, by juxtaposing the nozzle 44 with respect to the ball 36 and rotating the knurled collar 39 until a firm connection is established. Thereupon the operator grasps the handle 55 and pulls it outward once against the resistance of spring 56, whereby lubricant within the gun cylinder 48 is forced through the lateral inlet 52 to fill the interior of the discharge tube 50. Valve 33 in the inlet fitting acts as a check valve during this operation to prevent sucking of lubricant from the pipe line. If the pull is not directly in line with the axis of the gun, no material strain will be exerted upon the parts since the ball and socket joint between the gun and fitting permits of limited relative angular displacement for alignment with the direction of the pull. When the handle is now let go—assuming that the filter box is omitted from the line and the weather is warm and the oil correspondingly fluid—the expansion of the spring 56 causes the plunger 51 to move inward quickly toward the nozzle to eject or discharge the measured charge of lubricant in the tube 50, through the duct 37, opening inlet valve 33 against the opposition of spring 34 and transmitting the substantial pressure exerted by spring 56 through the oil filling the length of the line to the outlet fittings at the bearings. The pressure thus transmitted opens the valves 26 of the outlet fittings and forces the oil therethrough by seepage controlled substantially by the resistance of the minute crevices about the restriction pins. During discharge air enters the gun cylinder through vent plug 61, to maintain atmospheric pressure within the cylinder beyond the plunger.

In view of the high resistance of the filter and of the outlets O to flow, it might, particularly in cold weather when the oil has become viscous, take an appreciable interval for the spring 56 to discharge the gun, unless of strength greater than could be conveniently overcome by manual force.

If the source of oil pressure is a permanent part of the installation, it would be substantially a matter of indifference how long the automatic discharge may take. The use of a separate oil gun, however, to be applied to various inlets successively would be inconvenient were the discharge to take longer than a few seconds. Accordingly at a suitable location on each of the lines, preferably between the inlet fitting and the filter box, thereof, there is preferably provided a small pressure bell which may comprise a T-fitting 63 in the line having a stem 64 at right angles to the line the end of said stem permanently closed as by a screw cap 65. The air chamber 64, it will be seen, permits discharge of the gun in a short interval, notwithstanding the high resistance of the filter and of the outlets, a substantial part of the charge being quickly forced into said chamber and compressing the air therein. After completion of the discharge of the gun, inlet fiting valve 33 automatically closes and the oil gun is removed. The lubrication continues automatically as a consequence of the expansion of the compressed air within the air chamber 64 which acts as a secondary source of pressure transmitted through the length of the line, exerting pressure on inlet valve 33 to hold it closed, and maintaining outlet valves 26 open, to force lubricant slowly through the outlet fittings to supply the bearings.

The operation set forth is repeated by application of the gun at the remaining inlet fittings, that on the rear axle and that on the chassis frame, without need for refilling the gun which has enough oil for several operations. It is preferred in operation, to hold the gun with plug 60 uppermost as shown, so that the lateral inlet 62 for the tube 58 therein will extend downward below the oil remaining in the gun even when the latter is nearly empty, thereby assuring the sucking of oil rather than air, into the discharge tube 58.

By the invention, there is effected lubrication at all or many of the chassis bearings, with a minimum of effort and with the elimination of any flexible connections between the chassis frame and the axles therebelow. By reason of the slow flow through the outlet fittings, conduits of extraordinarily small diameter can be used between the air chamber and the outlets, and since no flexibility is required in the length of the line, rigid seamless metal piping may be and preferably is used throughout the installation.

Although there is shown the lengths of the various inlet fittings extending horizontally, it is understood that these may be inclined upward, particularly fittings $F^2$ and $F^3$ on the axles, so that the handle of the oil gun, in use, is substantially above the axle and can be pulled without need for stooping. The tie rod bearings 15 and the steering gear bearings moving relative to the front axle, it is preferred to direct the lubricant from the stationary front axle to the relatively movable steering knuckle by flow past the thrust bearing joint 84 at the top of the steering knuckle upon which the weight of the vehicle is supported. In the embodiment shown, the corresponding restriction outlet fitting O' is applied at the upper end of the axle clevis. The outlet fitting has two restriction pins 85 and 86 in parallel, pin 85 dripping to lubricate the king pin bearings therebelow. The lubricant which drips from restriction pin 86 passes by gravity past thrust bearing 84, through a corresponding duct 87 in the steering knuckle and emerges through fitting 88 to conduit 89 leading to the tie rod. Further detailed description of this construction and of the arrangement for lubricating both the tie rod bearing and the steering gear bearing at the left king pin, is not required, as it is fully described and claimed in copending application, Serial No. 613,476, filed Jan. 18, 1923.

After the pressure applied at the outlet fittings from the oil gun directly or indirectly through the air chamber 64 has subsided, the valves 26 at the various outlet fittings close to maintain the various pipe lines filled with oil, through which the pressure from the oil gun is transmitted in the next operation.

Lubrication of the various bearings on the chassis, it will thus be seen, requires merely three applications and operations of the oil gun, effecting economy of time and effort as compared to an arrangement in which each bearing must be lubricated by a separate and distinct application and operation of the gun. Moreover, the likelihood of overlooking or omitting the lubrication of one or more of the bearings is entirely obviated by the invention, as is the physical discomfort incurred in applying the gun at or near a relatively inaccessible bearing. Furthermore, the dirt sticking to the greasy inlet fittings is not forced into the bearings.

In the embodiment shown, the length of pipe line, the filter and inlet fittings are adequately protected by being mounted, as shown, to the rear of the axles, and in the interior of the channel frame, and the device includes no parts protruding substantially from the vehicle, thereby lessening the likelihood of part of the system being ripped off under conditions of heavy traffic. The inlet fittings are all, however, readily accessible from the exterior of the vehicle for application of the gun.

In lieu of the restriction duct fittings O, there may be employed measuring valve fittings of the type shown in various embodiments in copending application, Serial No. 596,856, filed October 25, 1922, one desirable form of which is shown in Fig. 9. For the purpose of the present application, it is merely noted briefly that the element comprises a pipe fitting 88 having a threaded elbow 89 to be applied in lieu of an oil cup at the bearing. A valve stem 90 extends through a corresponding bore 91 in the pipe fitting element and has a head 92 normally urged against the seat 93 by coil spring 94 and a second piston head 95 slidable in bore 96 and normally away from its seat 97. The element also includes a cup fitting 98 connected through a nipple 99 with the pipe line, there being secured in the bore of said cup, a chamois bag 100 normally distended by a coil spring as at 101 to perform the function of the strainer 39 in Fig. 8. It will be seen that a small measured quantity of lubricant is normally confined in the fitting between the two valve heads 92 and 95. Upon application of pressure from the lubricant gun, the chamois bag 100 collapses to transmit the pressure to the piston head 95 to force the latter longitudinally along the fitting, unseating the valve 92 until piston head 95 is urged against its seat 97. By this action, a quantity of lubricant equal to the predetermined charge confined between the two valve heads is passed through the nipple 99 to the bearing, the seating of valve head 95 by the pressure transmitted from the gun preventing the escape of any lubricant beyond that of the predetermined charge. After the pressure has subsided, lubricant from the line seeps through chamois bag 100 as spring 101 distends, and lubricant seeps past the piston head 95 to refill the chamber between the two heads, as spring 94 slowly urges valve 92 to its initial position shown in Fig. 9.

Where the measuring valve fittings are used, it will be seen, that each bearing receives a predetermined premeasured charge, as a slug, the line being automatically sealed after said charge is delivered. It is preferred to employ a gun with a discharge tube 50 having a measured charge somewhat in excess of the sum of the charges of the various measuring valves on the line, thereby assuring transmission of ample pressure through the line to effectively seal each of the measuring valves in its discharged position.

It is, of course, understood that, if desired, the restriction duct fittings of Fig. 8, and the measuring valve fittings of Fig. 9 may be used concurrently, on one and the same line, the former at the bearings where slow drip feed is desirable and the latter at any bearings at which a slug of oil may be preferred.

Although, as heretofore noted, the invention has its preferred application to the lubrication of the bearings on the chassis of a motor vehicle, many of the features thereof are applicable to the lubrication of bearings on other mechanisms.

No claim is made in this application to the construction of the individual elements per se. The drip plug, for instance, shown at Fig. 8 is separately claimed in the co-pending application Ser. No. 282,958, filed June 5, 1928, and since patented under No. 1,732,828 of Oct. 22, 1929. The measuring valve shown in Fig. 9 is separately claimed in co-pending application Ser. No. 596,856, filed October 25, 1922, and the filter of Fig. 4 is separately claimed in co-pending application Ser. No. 662,195, filed Sept. 12, 1923.

By seamless or solid tubing or piping is meant that such tubing or piping is free of open seams which would permit leakage of lubricant.

It will be noted that according to the system of the present application the inlet fittings F′, $F^2$ and $F^3$ afford quick detachable means in conjunction with the portable lubricant gun of Fig. 7 for coupling said gun to the conduit systems feeding the bearings.

For example, by a quick detachable coupling of the gun to the inlet fitting or nipple F′, it is possible to simultaneously supply the branched conduit system leading to four spring shackle bearings and the four spring hinge bearings. The branch conduits of these branched conduit systems each lead to an individual bearing or bearing structure, and are associated with valved fitting means, such as O and F′ to prevent return flow. These branched conduits are connected to a single main conduit having an inlet F′ so that it is possible by a single application of the lubricant gun of Fig. 7 to the inlet to simultaneously supply lubricant to all of the bearings. The lubricant gun and the metering fittings in the branched conduits respectively measure the total amount of lubricant and proportion this amount of lubricant among the bearings. The subsidiary system just described is supported upon the chassis frame, and the operation and construction of the systems supported on the front and rear axles are substantially the same.

On the front axle the separate branched conduits feeding measured quantities of lubricant to the tie rod, king pin, front wheel brake and steering gear bearings are connected to a common main conduit provided with the inlet arrangement or fitting means $F^2$ so that it is possible to supply all of these bearings simultaneously with the proper quantity of lubricant by a single detachable connection of the lubricant gun of Fig. 7. In the case of the rear axle the branched conduits to the rear wheel and to the rear brake shafts are connected to a common inlet conduit provided with the inlet arrangement $F^3$.

What is claimed is:

1. In a chassis lubricating installation, in combination, a plurality of independent lubricant conduits, one for each of the substantially distinct structural units of the chassis, said conduits including readily accessible inlet fittings for the nozzle of a lubricant gun and each including a plurality of outlets to corresponding bearings, and control elements in the lines, one near each of the outlets, the elements on each line responding automatically to pressure applied by the gun at the corresponding inlet fitting to deliver lubricant in predetermined proportions from the conduit to the bearings supplied from the branches thereof.

2. In a lubricating installation for motor vehicles, in combination, a chassis frame line and a front axle line, each having outlets respectively to corresponding bearings on the chassis frame and on the front axle, each said line comprising independent seamless metal piping fixed upon the corresponding vehicle structure, said lines having substantially identical inlet fittings for application of a lubricant gun, and control means in the lines responding automatically to pressure applied by the gun to deliver lubricant in predetermined proportions to the bearings.

3. In a lubricating installation for motor vehicles, in combination, a chassis frame line having outlets for chassis frame bearings, a front axle line and a rear axle line, each having outlets to corresponding bearings, each said line comprising independent seamless metal piping fixed upon the corresponding vehicle structure, said lines having substantially identical inlet fittings for application of a lubricant gun, and control means in the lines responding automatically to pressure applied by the gun to deliver lubricant in predetermined proportions to the bearings.

4. The combination set forth in claim 3 in which each of the control means comprises a highly restricted duct to absorb pressure transmitted from the lubricant gun and in which a resilient bell serves to store the pump discharge for subsequent slow delivery.

5. In a lubricating installation, in combination, a system of piping having branches and having an inlet fitting for application of a lubricant gun, said branches of high resistance to flow, and each having an outlet to corresponding bearings, means maintaining the line normally filled with oil, an air chamber communicating with the line, and a check valve near said inlet fitting, whereby upon application of oil pressure to the line through the oil gun, said air chamber will be charged, said check valve will close and said air chamber will apply pressure to expel lubricant through the outlet fittings to the bearings.

6. In a lubricating installation, in combination, a system of piping, having branches, bearings, outlet fittings connecting said branches to said bearings, each of said fittings having a highly restricted passage therethrough to control the delivery to the bearing, an inlet fitting connected to said piping, valve means normally maintaining said inlet fitting closed, said inlet fitting having means for application of an oil gun thereto, and an air chamber comprising a T fitting in said line having an arm projecting from said line and closed at its outer end.

7. In a lubricating installation, in combination, a system of piping having branches and having an inlet for application of a lubricant gun, said branches of high resistance to flow, and each having an outlet to a corresponding bearing, a pressure bell in the line, and near said inlet to store the charge from the gun and subsequently force the lubricant through the line and a check valve substantially at said inlet held closed during discharge by said bell.

8. In a lubricating installation, in combination, a system of piping having branches and having an inlet for application of a lubricant gun, said branches of high resistance to flow, and each having an outlet to a corresponding bearing, a filter in the line between the outlets and the inlet, and a pressure bell in the line between the inlet and the filter, to store the charge from the gun and subsequently force the lubricant through the filter and the line, and valve means between the pressure bell and the inlet held closed in the operation of the pressure bell.

9. In a lubricating installation for a motor vehicle, in combination, a line of piping extending along a structure part of the vehicle, said line having an inlet fitting for application of an oil gun accessible at said structural part, and having a plurality of outlet branches leading to various bearings, said outlet branches including control means responding automatically to pressure applied by the gun to deliver lubricant in predetermined proportions from the branches to the bearings, and a filter box in the length of the line of piping through which all of the lubricant from the inlet is passed in its flow toward the various outlets, said filter box secured to said structure part at the unexposed side thereof.

10. In a lubricating installation for motor vehicles, the combination of a distributing pipe system affixed upon the vehicle structure, said system including outlet branches leading respectively to corresponding chassis bearings, pressure responsive flow control means at said bearings, said branch system having a single inlet readily accessible from the exterior of the vehicle body and hood thereof, said inlet comprising a fitting constructed and arranged for removable application thereto of a supply of lubricant under pressure by means of which lubricant may be injected into the pipe system, said system including a single means in advance of all the branches to effect emission through the control means after the source of pressure has been withdrawn from the inlet fitting.

11. In a lubricating installation for motor vehicles, the combination of a distributing pipe system affixed upon the vehicle structure, said system including branches with flow rate restricting outlets leading respectively to corresponding chassis bearings, said branch system having a single inlet readily accessible from the exterior of the vehicle body, said inlet comprising a fitting constructed and arranged for removable application thereto of a supply of lubricant under pressure by means of which lubricant may be injected into the pipe system, said system including a single lubricant storage means in advance of all the branches to effect emission through the outlets after the source of pressure has been withdrawn from the inlet fitting.

12. In a lubricating installation for motor vehicles, in combination, chassis frame, front axle, and rear axle lubricant piping distributing systems, said systems having a plurality of outlets to bearings on the chassis frame, on the front axle, and on the rear axle to be lubricated, respectively, each said system further comprising a plurality of metal piping sections fixed upon the corresponding vehicle structure, said systems being provided with substantially identical inlet fittings for the application of a lubricant gun, said inlet fittings consisting of nipples provided with spring seated check valves and said gun being provided with detachable female nipple means to be received upon and embrace said inlet fitting nipples, said installation being provided with control means to deliver the lubricant in predetermined proportions to the bearings to be lubricated, said gun being adapted to be manually attached to said inlet nipples by a quick detachable connection and each of said systems being adapted to be successively supplied with lubricant by said gun by manually making detachable connections therewith and actuating said gun to supply lubricant to the system to feed the bearings.

13. In a lubricating installation for motor vehicles, in combination, piping systems attached to the chassis frame, to the front axle, and to the rear axle, each being independent of the others and consisting of a plurality of sections of metal piping fixed upon the corresponding vehicle structure, and having outlets to the bearings to be lubricated on the chassis frame, on the front axle, and on the rear axle respectively, said systems having independent readily detachable inlet connections respectively carried upon the chassis frame, the front axle, and the rear axle in a position readily accessible for the application of a lubricant gun from the exterior of the vehicle, said inlet connections consisting of male nipples each provided with spring seated check valves and said gun being provided with a single pressure applying piston member enclosed in a cylinder and provided at one end with manually detachable female nipple means to be received upon and embrace said male nipple, said systems being successively supplied with lubricant pressure from said gun by successive manual detachable connections between the female nipple means of said gun and the male nipples of said systems, said installation being also provided with means to predetermine the proportion of lubricant among said bearings.

14. In a machine lubricating installation, in combination, a plurality of independent lubricant conduits, one for each of the substantially distinct structural units of the machine, said conduits including readily accessible inlet fittings for the nozzle of a lubricant gun and each including a plurality of outlets to corresponding bearings, and control check-valved elements in the lines, one near each of the outlets, the elements on each line responding automatically to pressure applied by the gun at the corresponding inlet fitting to deliver lubricant in predetermined proportions from the conduit to the bearings supplied from the branches thereof.

15. In a lubricating installation, for a machine having a main structural frame and a relatively movable structural element, each carrying bearings to be lubricated, in combination, a main frame line and a relatively movable element line, each having outlets respectively to corresponding bearings on the frame and on the relatively movable element, each said line comprising independent seamless metal piping fixed upon the corresponding structure, said lines having substantially identical inlet fittings for application of a lubricant gun, and control check-valved means in the lines responding automatically to pressure applied by the gun to deliver lubricant in predetermined proportions to the bearings.

16. In a lubricating installation for a machine having a main structural frame and a relatively movable structural element, each carrying bearings to be lubricated, in combination, a main frame line having outlets for the frame bearings, a relatively movable element line, each having outlets to corresponding bearings, each said line comprising independent seamless metal piping fixed upon the corresponding structure, said lines having substantially identical inlet fittings for application of a lubricant gun, and control check-valved means in the lines responding automatically to pressure applied by the gun to deliver lubricant in predetermined proportions to the bearings.

17. The combination set forth in claim 16 in which each of the control means comprises a highly restricted duct to absorb pressure transmitted from the lubricant gun and in which a resilient bell serves to store the pump discharge for subsequent slow delivery.

18. In a lubricating installation for a machine structure carrying bearings to be lubricated, the combination of a distributing pipe system affixed upon the structure, said system including outlet branches leading respectively to corresponding bearings, pressure responsive flow control check-valved means at said bearings, said branch system having a single inlet readily accessible from the exterior of the machine, said inlet comprising a fitting constructed and arranged for removable application thereto of a supply of lubricant under pressure by means of which lubricant may be injected into the pipe system, said system including a single means in advance of all the branches to effect emission through the control means after the source of pressure has been withdrawn from the inlet fitting.

19. In a lubricating installation for a machine structure carrying bearings to be lubricated, the combination of a distributing pipe system affixed upon the structure, said system including branches with flow rate restricting outlets provided with spring-seated check valve means and leading respectively to corresponding bearings, said branch system having a single inlet readily accessible from the exterior of the machine, said inlet comprising a fitting constructed and arranged for removable application thereto of a supply of lubricant under pressure by means of which lubricant may be injected into the pipe system, said system including a single lubricant storage means in advance of all the branches to effect emission through the outlets after the source of pressure has been withdrawn from the inlet fitting.

20. In a lubricating installation for a machine structure having a plurality of relatively movable structural elements connected to each other, in combination, lubricating piping distributing systems on said elements, said systems having a plurality of outlets to bearings on said respective elements to be lubricated, each said system further comprising a plurality of metal piping sections fixed upon the corresponding element, said systems being provided with substantially identical inlet fittings for the application of a lubricant gun, said inlet fittings consisting of nipples provided with spring seated check valves and said gun being provided with detachable female nipple means to be received upon and embrace said inlet fitting nipples, said installation being provided with control means to deliver the lubricant in predetermined proportions to the bearings to be lubricated, said gun being adapted to be manually attached to said inlet nipples by a quick detachable connection and each of said systems being adapted to be successively supplied with lubricant by said gun by manually making detachable connections therewith and actuating said gun to supply lubricant to the system to feed the bearings, said outlets of said piping distributing systems being also provided with spring-seated check valves cooperating with the spring-seated check valves in the inlet fittings to maintain the piping distributing systems substantially filled with lubricant.

21. In a lubricating installation for a machine structure having a plurality of relatively movable structural elements connected to each other, in combination, piping systems attached to the said elements, each being independent of the others and consisting of a plurality of sections of metal piping fixed upon the corresponding element, and having outlets to the bearings to be lubricated on said elements, said systems having independent readily detachable inlet connections respectively carried upon the elements, in a position readily accessible for the application of a lubrican gun from the exterior of the structure said inlet connections consisting of male nipples each provided with spring-seated check valves and said gun being provided with a single pressure applying piston member enclosed in a cylinder and provided at one end with manually detachable female nipple means to be received upon and embrace said male nipple, said systems being successively supplied with lubricant pressure from said gun by successive manual detachable connections between the female nipple means of said gun and the male nipples of said systems, said installation being also provided with means to predetermine the proportion of lubricant among said bearings, said last mentioned means including fittings serving to connect the outlets of said sections of metal piping to the bearings to be lubricated and each including a filler member to cause metering of the lubricant, a strainer member to protect said filler member and a spring-seated check valve member to cooperate with the spring-seated check valves in said inlet connections and maintain said piping systems substantially filled with lubricant at all times.

AUTO RESEARCH CORPORATION,
*Assignee of Joseph Bijur, deceased,*
By EDWARD H. KOCHER,
*President.*